June 18, 1929.  T. RIVAL  1,718,007
WEIGHING MACHINE
Filed July 15, 1925   3 Sheets-Sheet 1

Inventor:
Théophile Rival
by M. Laurie
Attorneys

June 18, 1929.   T. RIVAL   1,718,007
WEIGHING MACHINE
Filed July 15, 1925   3 Sheets-Sheet 2
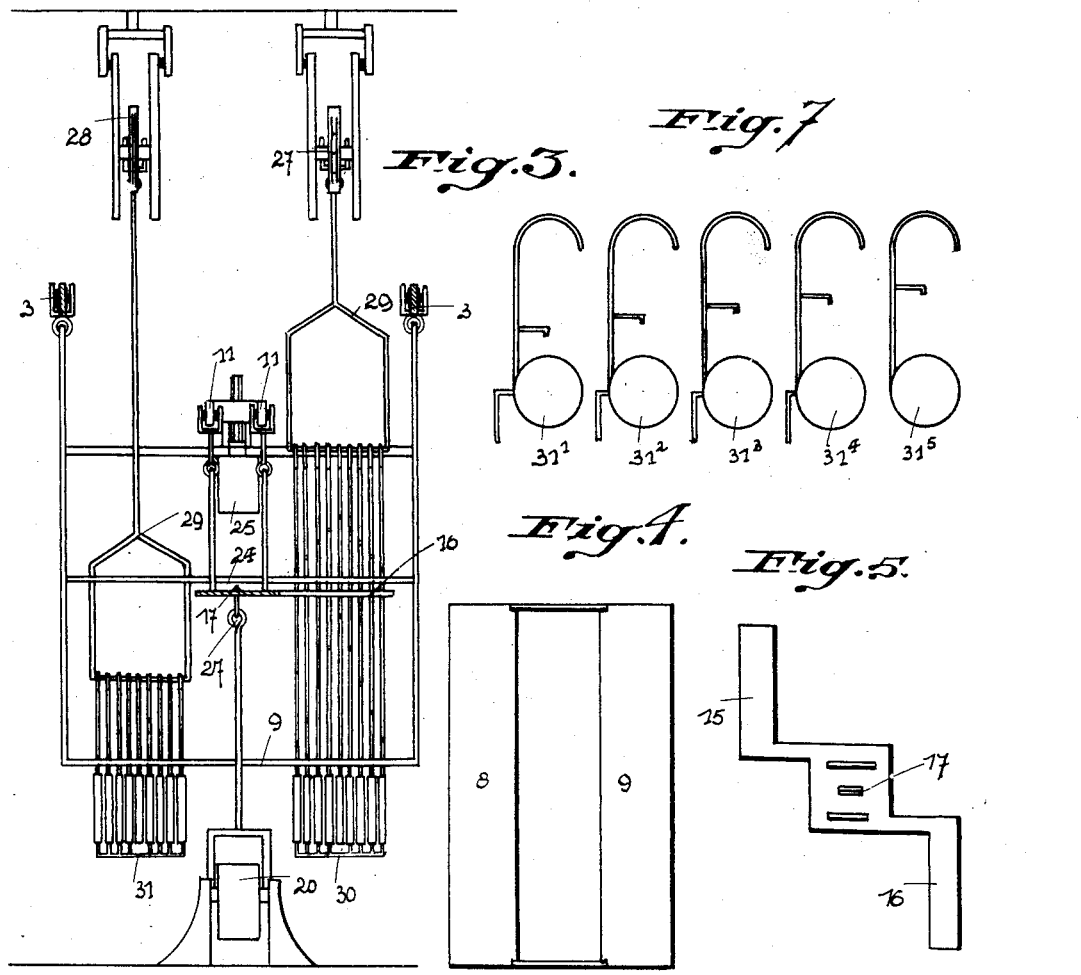

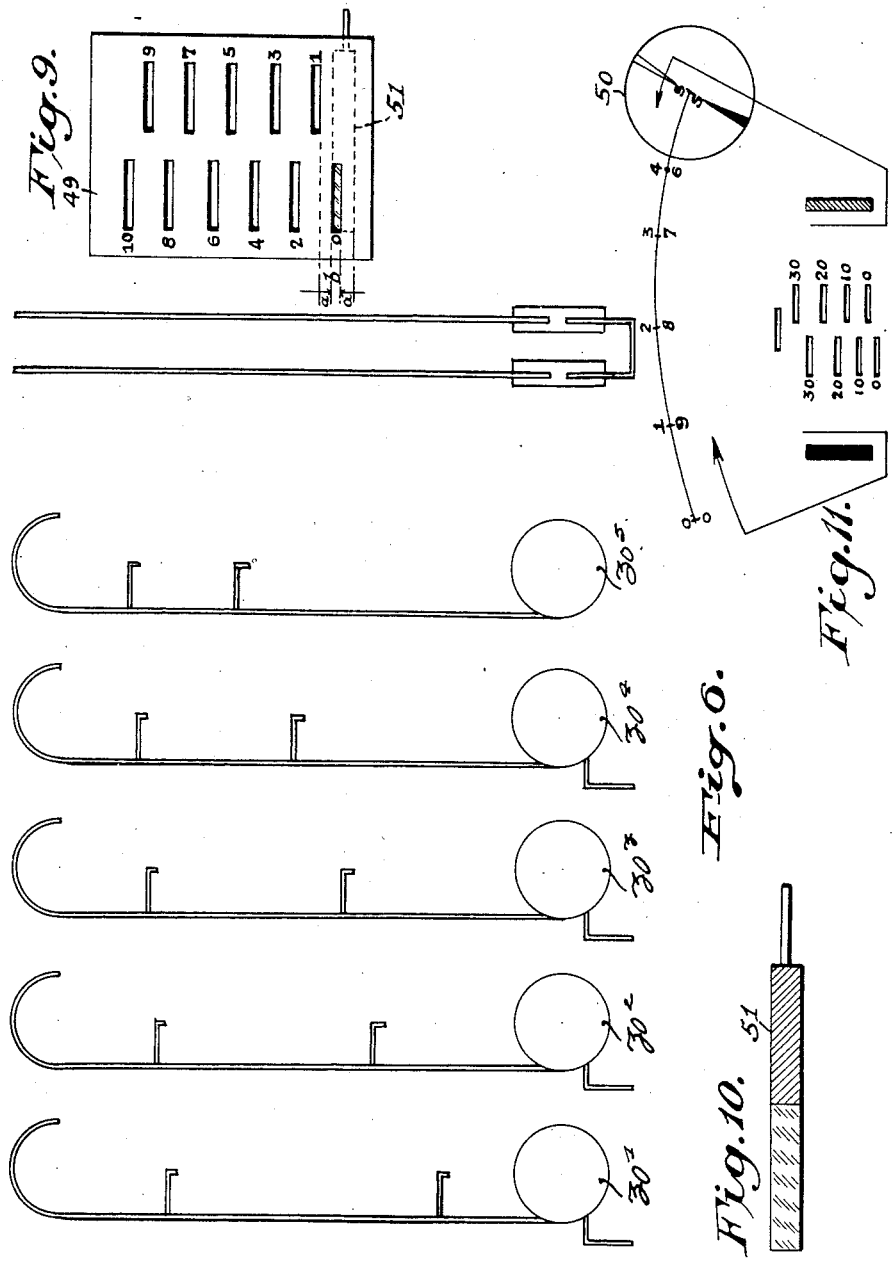

Patented June 18, 1929.

1,718,007

UNITED STATES PATENT OFFICE.

THÉOPHILE RIVAL, OF GHENT, BELGIUM.

WEIGHING MACHINE.

Application filed July 15, 1925, Serial No. 43,860, and in Belgium July 28, 1924.

In this patent the weight units and the decimal fractions of the weight unit are directly read on dials, the load to be poised, when deposited in the load pan of the device, causing the weights pan to rise and take up successively, one by one and alternately at one side and then on the other side of said weights pan, weight units of two series, suitably suspended from the ends of a balanced lever, the remaining fraction in excess of the number of weight units lifted being indicated by a pendulous lever and the total weight indicated altogether by a pointer on a dial with a zigzag track moving with the weights pan.

The principal inconvenience of the automatic weighing machines of the kind known until now, consists in that the weights to be taken by the weights scale are suspended above the scale from one single weights carrying lever or balance, whereby the weights are attained one by one and alternately on one side and then at the other side of the said scale.

The main object of the present invention is to obtain the symmetrical action of the weights on the weights scale and consists essentially in the use of two weights carrying balances disposed in parallel relation above the weights scale of the weighing balance proper and supporting each two series of particularly shaped weights hanging free on stirrups and disposed by pairs one on each balance, at equal distance of the scale.

The simultaneous and symmetrical action of the scale on two weights is transmitted altogether to a pendulous lever; this new disposition permits the application of the known principle to single beam balances and in every other case more accuracy of the weighing result.

For the same end, the shape of the weights is such, that they are suspended above the scales and nevertheless have their masses hanging underneath the same, so that they can only come in contact with the scales, by supporting pins provided on lateral hooked stems fixed on their masses. They are formed each of two masses provided each with a hooked stem and connected together by horizontal branches of variable length so that they can be disposed each of them symmetrically on the supports and taken off without disturbing the equilibrium proper of said supports.

Further on, the reading of the weighing result is surer and easier as in the known devices of the kind, by the separate indication of decimals and units, the units being indicated on an apertured board fixed on the frame with an indicator moving behind and fixed on the weights scale. This indicator shows continually the same colour until the designed unit is slightly surpassed and making then the change of the unit and of the colour. The decimals are to be read in the same colour as the units shown on a double numerated and coloured dial fixed on the frame by a pointer connected with the pendulous lever.

The invention is illustrated in the accompanying drawings in which:

Fig. 3 is a side elevation, partly sectioned of the same.

Figs. 4, 5 are plan views of the main balance weights scale and auxiliary weights receiver.

Figs. 6, 7 shows the weights of the device one in side view;

Fig. 8 is a view of the device for indicating the results of the weighing in beam balances.

Fig. 9 is an elevation of the board on which the units are to be read.

Fig. 10 is an elevation of the indicator moving behind the board shown in Fig. 9.

Fig. 11 is a view similar to Fig. 8, indicating the weighing indicating dial for heavy load weighing machines.

Figure 1:
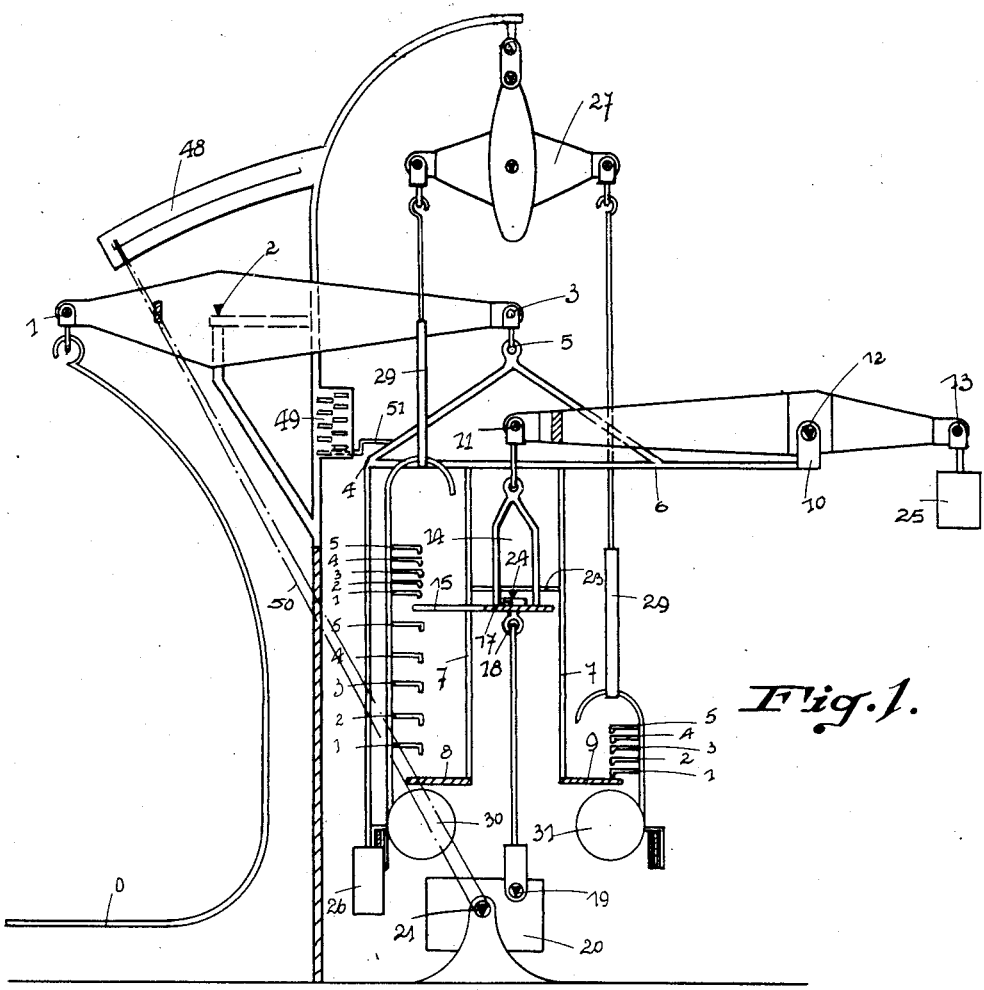
Fig. 1 is a vertical elevation (partly sectioned near the longitudinal axis) of a usual balance provided with the improved device, the load pan being empty.
Figure 2:
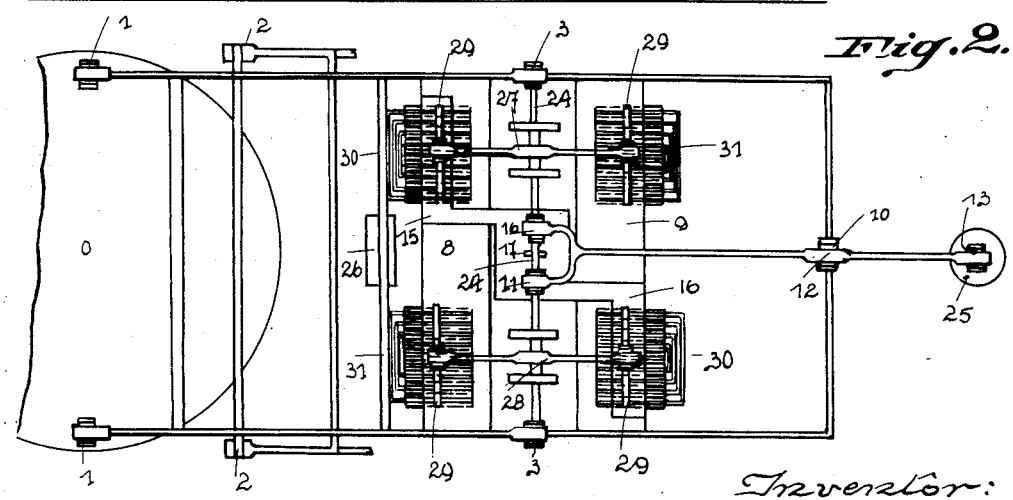
Fig. 2 is a plan view of the same.

Figs. 1 to 3 illustrate the novel arrangement applied to a double beam balance in which the action of the scale on two weights is continually transmitted to a pendulous lever by the means of the two weights carrying balances acting by two other weights on an auxilary weights receiver formed of two alternate parts and connected underneath the pendulous lever resting on the frame. This auxiliary weights receiver hangs from the end of an auxiliary balance supported by the brackets of the main weights scale, the other end of this auxiliary balance supporting a counterpoise for determining a pressure of the value of the chosen unit between a blade fixed on the auxiliary weights receiver and another blade fixed on a convenient piece of the main weights scale supporting branches.

The devices shown in Figs. 1 to 3, illustrate the novel arrangement applied to a usual balance comprising a double beam 1, 2, 3 fulcrumed at 2 on supports integral with the frame. O indicates a portion of the load pan supported at I on brackets. Symmetrical brackets 4, 5, 6 carry by means of supports 7, the plates 8, 9 (Fig. 4) forming the weights scale of the main balance. On said brackets is carried further at 10 an auxiliary balance 11, 12, 13 the length of the arm 11, 12 being equal to the length of the arm 2, 3 of the main balance. The point 10 has been determined in such a way that the points 11 are just symmetrically above the middle of the main weights scale.

The auxiliary balance has a forkshaped left end and carries at 11, on two symmetrical brackets 14, an auxiliary weights receiver, formed of two equal angular plates 15, 16 being equal half of the weights plates 8, 9, and alternately arranged apart from each other above the plates 8, 9. Said auxiliary weights receiver 15, 16, which carries at its center a blade 17 having its edge turned upwards, is connected by a hook 18 fixed beneath it, to the bearings carrying the knife 19 of a pendulous lever formed by a mass 20 resting by means of a knife 21 on supports integral with the frame, said mass being formed and balanced in such a manner that, when the pull exerted by one weight unit, placed in the load pan, is exerted on the knife edge 19 of the said mass 20, it swings round the knife 21, the vertical displacement between 21 and 22 being designed hereinafter by character $a$.

The plates 8 and 9 carrying branches 7 are connected together at 23 and on this connection is fixed a blade 24 with downward turned edge bearing on the upwardly directed edge of the blade 17 integral with the plates 15 and 16, in such a manner that the upwards movement of the plates 15, 16, connected with the end 11 of the auxiliary balance 11, 12, 13 is limited by said edge 24.

A counterpoise 25 suspended at 13 (Fig. 1), balances the auxiliary weights receiver 15, 16, the connecting parts between the hook 18 and the knife 22 of the pendulous lever and also the unit of load to be weighed by the pendulous lever.

On two branches 4 of the brackets 4, 5, 6 is suspended a counterpoise 26 to obtain the equilibrium of the weights scale.

Two identical balances 27, 28, which I call the weights carrying balances, are disposed in parallel relation to each other and symmetrically above the main balance weights scale 8, 9 and the auxiliary weights receiver 15, 16. The beams of said balances carry each in inverted order, on adjustable stirrups 29, two groups of weights, on one side one group of weights 30 and on the other side a group of weights 31. All the weights hang freely on the stirrups in which they can be raised. These weights are all equal to one half of the unit; they are all formed of masses with hooked stems, the masses hanging underneath the scales, with the weights suspended above the same (Figs. 1, 2, 3) by lateral hooked stems furnished with supporting pins. The weights are each composed of two masses rigidly connected by horizontal branches of different lengths suspended by the hooks on yokes, whereas the central one on the yokes has only one single stem.

All the weights 30 having the longest stems, are each provided with two supporting pins, and disposed with their upper pins above the scale 15, 16, of the auxiliary balance and with their lower pins above the main weights scale 8, 9. The weights 31 have the shorter stems and are provided with one single supporting pin above the uncovered parts of the plates 8, 9 of the main weights scale.

All the weights are hung by pairs of equal series at the same distance of the weights scale and weights receiver.

It will be seen (Figs. 1, 3) that, owing to this arrangement of the weights, each of them may be taken off the yokes without disturbing the equilibrium proper and that the weights will always engage the scales in series of two and on symmetrical parts of the weights scale.

The distances between the supporting hooks and pins of the weights will be determined as follows:

$a$ being the vertical displacement of the knife-edge 22 for the unit; $b$ being a lost movement chosen according to the width of the slots on the board indicating the units.

The pins of the weights should be at the beginning, at zero, for the first series of two weights 30, 31, as follows:

The first weights 30 should be, by their upper pins, at the distance from the weight receiver 15, 16, equal to the vertical displacement of the knife-edge 22 of the pendulous lever for the unit ($a$).

The weights 31 should be, with their single pins, at such a distance, as to come only in contact with the weights scale 8, 9 after a vertical move equal to the vertical displacement of the knife-edge 19 of the pendulous lever augmented by the amount $b$ of a lost move chosen according to the widths of the slots on the board indicating the units ($a+b$) as will be explained hereinafter, and for the weights 30, by their lower pins, at a distance so determined as to be only in contact with the main scale 8, 9 after a complete move of the pendulous lever in an upward and downward direction, augmented by twice the same amount: ($3a+2b$).

The disposition of the pins should be such as to allow for each subsequent series of two weights, these pins to come successively at the end of each full movement at the same distances respectively for the weights 30 and 31 from the weight scales 8 and 9 and 20 and 21 as the first ones.

The height of the stirrups should be sufficient to permit the complete rise without contact of the hooks with these stirrups.

A complete movement of the balance (weighing of two units) comprises four steps:

1. A complete movement of the pendulous lever in an upward direction (first unit).

Such movement will be produced by the action of the load in the load pan resulting in a pull on the hook 18, connected altogether with the pendulous lever and the weight receiver 15, 16 of the auxiliary balance, this last being fixed on the main scale by the working of the counterpoise 25, to the limit of the weight unit.

2. At the end of the first movement the pendulous lever balances the counterpoise 25 of the secondary balance 11, 12, 13 and thereby the scale 15, 16, which has attained the first weight 30, does not proceed rising with the main scale 8, 9.

An upwards lost movement of the chosen amount $b$ produced by a small excess of load will bring the scale 8, 9 in connection with the first weights 31.

3. After the two first movements, an additional load acting by the plates 8, 9 on the weights 31 and through the agency of the auxiliary balances 27 and 28 upon the plates 15, 16 by the upper pins of the weights 30, causes the pendulous lever to move downwards.

4. The second unit slightly displaced, another upwards lost movement produced by a little excess of load will bring the scale 8, 9 in connection with the lower pins of the first weight 30, the corresponding weights 31 being raised to the same amount in the stirrups. The second series of weights being now in the same conditions as the first ones, at the beginning of the motion, the balance may again start the tensioning movement on the pendulous lever, whilst the raising of the scale 8, 9 causes the weights to pass, said weights being disengaged and raised into the yokes. The scale will again accomplish the same movements and may take another series of weights and so on.

The pulling on the pendulous lever is successively permitted, for the odd units after the first, by the action of two weights 30 engaged with their upper pins on the weights receiver 15, 16 and coming with their lower pins in contact with the scale 8, 9.

Upon the withdrawal of the load, the weights and balances will be automatically moved back to their initial positions.

For the reading of the weighing result the pendulous lever bears a pointer 50 fixed on it and swinging successively in opposite directions, in front of a dial 48 (Fig. 11) fixed on the frame, with double graduations extending from a common point inwardly and outwardly from the arc and bearing different numbers; one graduation 0–1000 from the left to the right on one colour, and another 1000–0 from the right to the left in another colour (Fig. 10).

The reading of units, which in this system will determine the colour in which the decimals are to be read on the dial, will be made as follows:

A board 49 fixed on the frame (Figs. 8 and 9) is provided with apertured grooves of the width $b$ arranged alternately at the left and the right of a central space. Said grooves are spaced apart from axis to axis 0—1—1—2 a distance $a+b$.

A rectangular index 51 (Fig. 10) fixed on a convenient part of the weights scale supports and the height of which also being equal to $a+b$, is vertically divided into two equal differently coloured parts, the colours corresponding to the colours of the decimal dial, and moved behind said grooves, in such a manner that the balance starting at zero with the index tangential to the upper rim of the left lower groove, indicates 0, until the weight has slightly exceeded one unit and then a lost move of the balance will make the change of the unit and of the colour.

In scales for heavy loads, weighing machines and weighbridges (Fig. 11) the dial may each time indicate five units and the table will indicate two zeros, two ten, two twenty, and so on, the colour of the zero or the unit of tens will indicate whether the dial one to five or the dial five to ten is to be read.

The weight supporting yokes for machines for heavy loads will be notched for each weight.

One weight 30 and one weight 31 at such balance permit to weigh three units.

Two weights 30 and two weights 31 at such balance permit to weigh five units.

Five weights 30 and five weights 31 at such balance permit to weigh eleven units.

The mechanism is applicable to any desired beam balance or weighing machine.

Dampers, (not shown), the number and size of which will be suitable for each kind of instrument, may be applied to the same.

All these parts except the scale are enclosed in a housing permitting of the dials to be read from the outside and at each side.

Having now described my said invention what I claim is:

1. An improved automatic weighing machine of the type in which the weight of the poised load may be read directly, comprising a frame, a double symmetrical beam, forming the main balance, mounted on said frame, a load pan suspended on one end of said double beam, symmetrical brackets suspended at the opposite end of said main balance beam, supporting branches extending downwards from said brackets, two plates forming the weights scale of the main balance secured to the lower ends of said branches, two identical weights carrying balances secured on the frame and symmetrically disposed with respect to and above the main balance weights scale, stirrups on the beam ends of said two balancees, four series of weights hanging symmetrically and by series of two, at equal distance of the weights scale on the said stirrups, said weights being formed of masses with lateral hooked stems, and suspended by the latter on the said stirrups, in which they may be raised, notwithstanding the fact that their masses are hanging underneath the main weight scale, hooked suspension pins provided on the stems of said masses and arranged so as to permit a lost movement of a determined value between each contact of the said weight scale with the weights, a pendulous lever oscillating on the frame, connecting means between said pendulous lever and the main balance, whereby the pressure exerted on two suspended weights by the weights scale under the action of the load placed in the load pan, is transmitted by the intermediate of said connecting means to the pendulous lever, which is thereby pulled and driven back alternately by the said pressure successively for each unit of the load, a double colored dial secured to the frame, a pointer fixed on said pendulous lever and moving in front of said dial for reading the decimals of the load weight and an index fixed on the load scale and indicating successively, in proportion as the weight scale raises under the action of the load, the units of the load weight.

2. An embodiment of the improved weighing machine of the type described, comprising a frame, a double symmetrical beam, forming the main balance, mounted on said frame, a load pan suspended on one end of said double beam, symmetrical brackets suspended at the opposite end of said main balance beam, supporting branches extending downward from said brackets, two plates forming the weights scale of the main balance secured to the lower ends of said branches, two identical weights carrying balances secured on the frame and symmetrically disposed with respect to and above the main balance weights scale, stirrups on the beam ends of said two balances, two series of weights hanging symmetrically and by series of two at equal distance of the weights scale on the said stirrups, said weights being formed of masses with lateral hooked stems, and suspended by their hooks on the stirrups in which they may be raised, notwithstanding the fact that their masses are hanging underneath the main weight scales, hooked suspension pins provided on said masses and arranged so as to permit a lost movement of a determined value between each contact of the said weight scale with the weights, a pendulous lever oscillating on the frame, connecting means between said pendulous lever and the main balance, said connecting means comprising besides the said weights and the said two weights carrying balances, a secondary weights receiver formed of two alternate parts hanging just above the main weights scale, a blade on the bottom of said weights receiver, horizontal connecting members between the main balance weights scale carrying rods, a blade on said connecting members at right angles to the blade of the auxiliary weights receiver, a hooked vertical link connecting the latter to a knife of the pendulous lever, connecting rods fastened on the upper side of said weights receiver and hanging at one end of an auxiliary balance supported by the brackets of the main weights scale and a counterpoise at the free end of said auxiliary balance for producing on said main balance weights scale a pull corresponding to the value of the unit, a board fixed to the frame or load scale for indicating the weight units contained in the load, alternate horizontal apertures disposed in two vertical rows on said board, a double colored index secured to the weights scale and moving behind both said rows of apertures showing constantly the same color during the same unit, a double colored dial with two opposite graduations fixed on the frame, and a pointer fixed on the pendulous lever moving in front of said dial for indicating the decimals on the double coloured dial, lost movement of the balance, causing the change of unit design and of the color in which the decimals have to be read on the said dial.

In testimony whereof I have hereunto set my hand.

THÉOPHILE RIVAL.